United States Patent [19]

Liu

[11] Patent Number: 5,204,998

[45] Date of Patent: Apr. 27, 1993

[54] SAFETY HELMET WITH BELLOWS CUSHIONING DEVICE

[76] Inventor: Huei-Yu Liu, P.O. Box 55-1670, Taipei (10477), Taiwan

[21] Appl. No.: 885,443

[22] Filed: May 20, 1992

[51] Int. Cl.⁵ .............................................. A42B 3/00
[52] U.S. Cl. ........................................ 2/411; 2/425
[58] Field of Search .............. 2/410, 411, 412, 413, 2/414, 423, 425; 267/153, 142, 145, 292

[56] References Cited

U.S. PATENT DOCUMENTS

| | | | |
|---|---|---|---|
| 3,116,490 | 1/1964 | Zbikowski | 2/414 |
| 3,500,475 | 3/1970 | Otsuka | 2/425 |
| 3,877,076 | 4/1975 | Summers et al. | 2/414 |
| 4,534,068 | 8/1985 | Mitchell et al. | 2/414 |
| 5,101,517 | 4/1992 | Douglas | 2/425 |

FOREIGN PATENT DOCUMENTS

| | | | |
|---|---|---|---|
| 48442 | 3/1982 | European Pat. Off. | 2/413 |
| 2370448 | 7/1978 | France | 2/412 |
| 7709104 | 2/1978 | Netherlands | 2/411 |

*Primary Examiner*—Clifford D. Crowder
*Assistant Examiner*—Michael A. Neas

[57] ABSTRACT

A safety helmet includes an outer shell juxtapositionally secured with an inner shell defining an air chamber between the two shells, a plurality of cushioning bellows retained between the two shells, an air-penetrable layer adhered on an inside surface of the inner shell disposed around a wearer's head, and a cap frame sealably combining the two shells and the air-penetrable layer to form a complete safety helmet having a great dampening effect for reducing an external impact force acting upon the helmet by the plurality of cushioning bellows between the two shells for enhancing safety of a wearer of the helmet.

3 Claims, 3 Drawing Sheets

# SAFETY HELMET WITH BELLOWS CUSHIONING DEVICE

BACKGROUND OF THE INVENTION

Peter J. Lovell disclosed a protective helmet in his U.S. Pat. No. 4,307,471 by providing a plurality of projections (25) between an outer shell (21) and an inner shell (22). Since the projections (25) are substantially rigid, the helmet as being subjected to a serious external impact force would not effectively dampen the external force, thereby still being dangerous to a helmet wearer.

Leonard P. Frieder et al. disclosed a custom-fitted helmet in their U.S. Pat. No. 4,345,338 incorporating sack (12) containing resin-bead composite (20) in the inner sheet (16) inside the outer sheet (14) and a plurality of molding extrusions (30, 32, 34 and 36) inserted in between the outer and inner sheets, thereby forming a helmet filled with almost "solid" matters in between the outer and inner sheets 14, 16 to increase a weight worn by the wearer and to reduce air penetrable space to influence ventilation within the helmet to easily cause uncomfortableness and tiredness to the wearer.

The present inventor has found the drawbacks of the conventional helmets and invented the present safety helmet with bellows cushioning device.

SUMMARY OF THE INVENTION

The object of the present invention is to provide a safety helmet including an outer shell juxtapositionally secured with an inner shell defining an air chamber between the two shells, a plurality of cushioning bellows retained between the two shells, an air-penetrable layer adhered on an inside surface of the inner shell disposed around a wearer's head, and a cap frame sealably combining the two shells and the air-penetrable layer to form a complete safety helmet having a great dampening effect for reducing an external impact force acting upon the helmet by the plurality of cushioning bellows between the two shells for enhancing safety of a wearer of the helmet.

DETAILED DESCRIPTION

Figures 1, 1A:
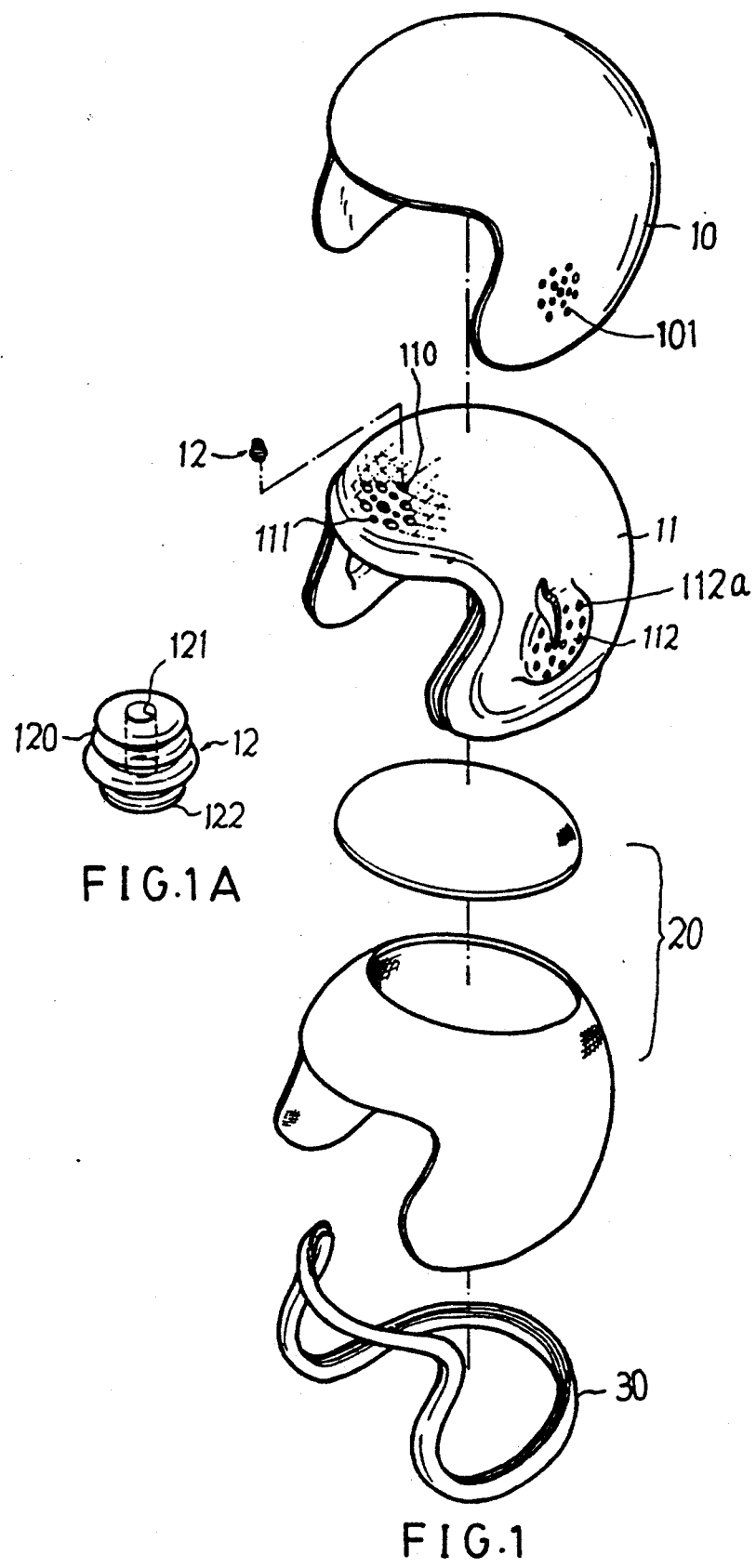
FIG. 1 is an exploded view showing all elements in construction of the present invention.
FIG. 1a shows a cushioning bellows of the present invention.
Figure 2A:
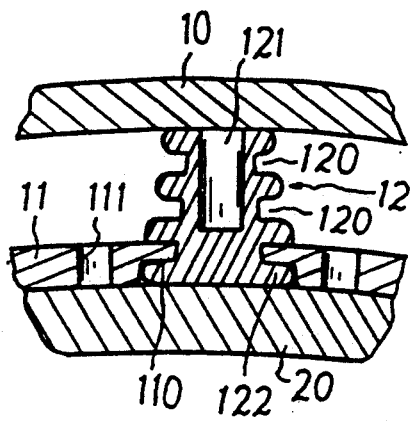
FIG. 2A is a partial sectional drawing of the present invention enlarged from FIG. 2.
Figure 2:
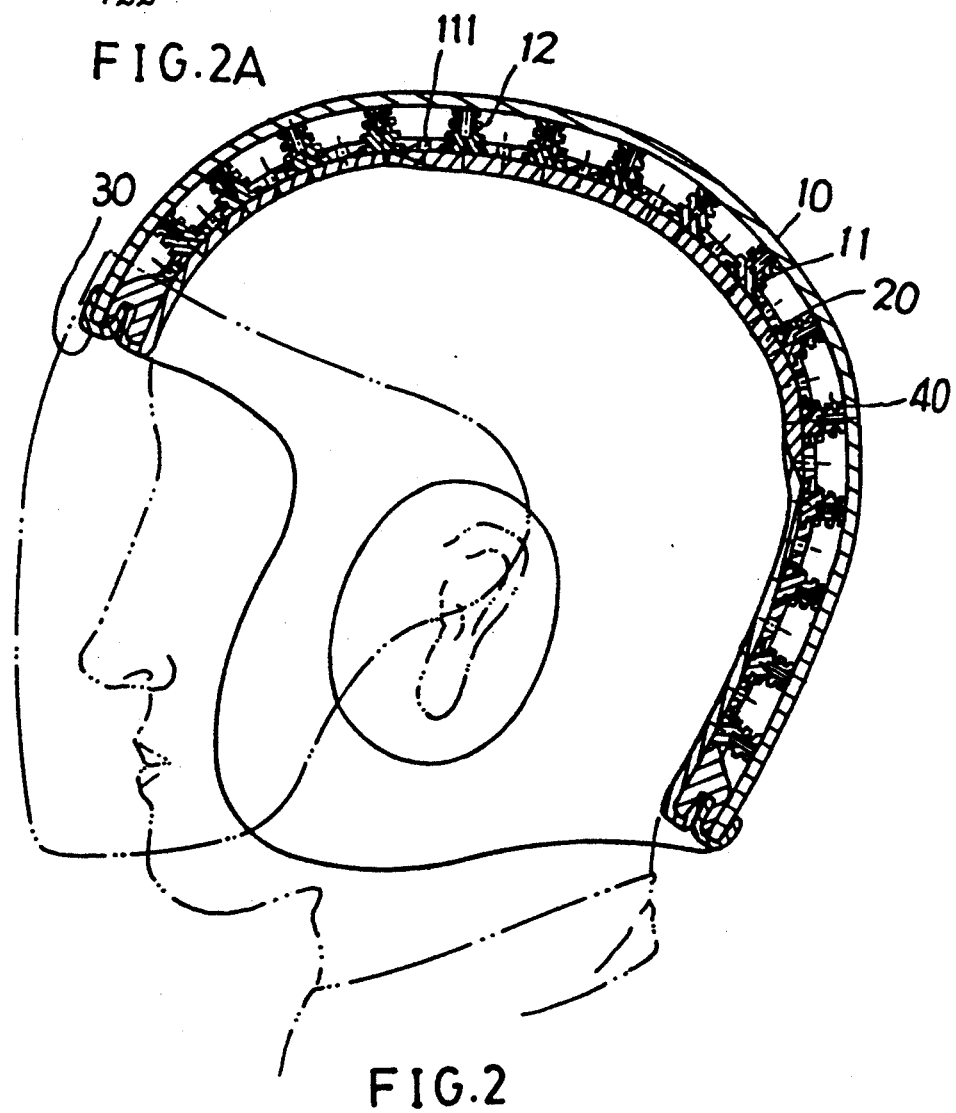
FIG. 2 is a sectional drawing of the present invention.

As shown in FIGS. 1, 2, the present invention comprises: an outer shell 10; an inner shell 11 juxtapositionally secured to the outer shell 10 confining an air chamber 40 spaced between the outer shell 10 and the inner shell 11; a plurality of cushioning bellows 12 each bellows 12 retained between the outer shell 10 and the inner shell 11; and air-penetrable layer 20 adhered on an inside surface of the inner shell 11; and a cap frame 30 sealably combining the outer shell 10, the inner shell 11 and the air-penetrable layer 20 for forming a complete helmet to be worn by a wearer, whereby upon an acting of an external impact force upon the outer shell, the cushioning bellows 12 will dampen the external impact force to prevent a great shock caused by the external force to the wearer's head.

The inner shell 11 is formed with a plurality of venting holes 111 in the inner shell 11 for fluidically communicating the air chamber 40 defined between the two shells 10, 11, and the air-penetrable layer 20 adjacent to a wearer's head.

Each cushioning bellows 12 preferably made of resilient elastomers includes: a plurality of flexible corrugated flanges 120 circumferentially gradationally formed on an outer cylindrical wall of the bellows 12, a central socket 121 formed in a central portion of the bellows 12 and downwardly recessed from an upper portion of the bellows 12 having an uppermost flange 120a of the corrugated flanges 120 normally contacting an inside surface of the outer shell 10 generally forming an air sac in the central socket 121 between the bellows 12 and the outer shell 10, and a retaining base portion 122 formed on a bottom portion of the bellows 12 engageably fixed in each bellows hole 110 formed in the inner shell 11 as shown in FIG. 2A.

The inner shell 11 further includes a pair of ear shields 112 on two opposite sides of the inner shell 11 for holding a wearer's two ears in the shields 112 having a plurality of inner perforations 112a drilled in each ear shield 112; and the outer shell 10 also includes a plurality of outer perforations 101 drilled in two opposite sides on the outer shell 10 projectively corresponding to the two ear shields 112 of the inner shell 11 for transmitting outside or environmental sound waves through the outer perforations 101, the inner perforations 112a, and the air-penetrable layer 20 towards the wearer's ears.

The outer perforations 101 formed in the outer shell 10 will also serve for ventilating the air or moisture from or in the air chamber 40 between the outer shell 10 and the inner shell 11 and from the wearer's head for a comfortable wearing of the helmet.

The air-penetrable layer 20 of the present invention may be made of clothes, fibers, sponges or foams having ventilated perforations or apertures therein and not limited in this invention. The layer 20 can be made to be separable as two pieces as shown in FIG. 1 or just one piece, which is also not limited.

Figure 3:
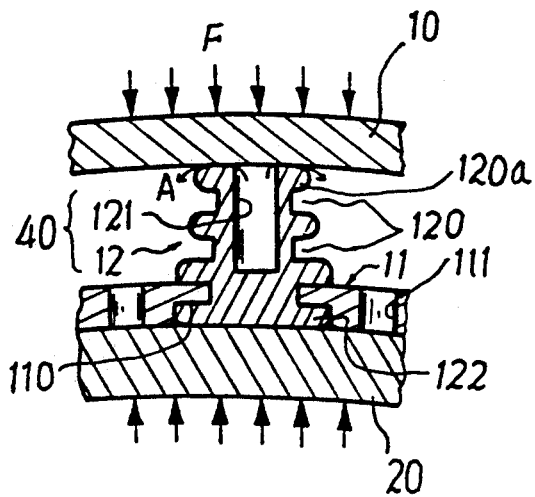
FIGS. 3 and 3A show conditions of the present invention when subjected to external impact force.
Figure 3A:
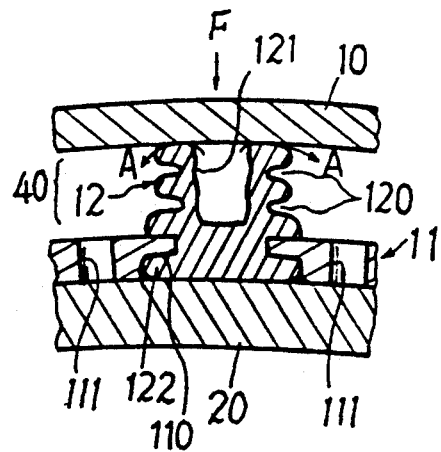

When wearing the present invention by a wearer and an external impact force F acting upon the helmet of the present invention as shown in FIGS. 3, 3A, the impact force F will compress the bellows 12 to release the air in the socket 121 outwardly into the chamber 40 (direction A) to dampen the force F partially and the compression of the corrugated flanges 120 of the bellows 12 will also weaken the force F, and moreover the bellows as made of elastomer material will itself serve as or ack like a "spring" for a buffer of the impact force F.

Therefore, the present invention can greatly dampen, weaken or minimize an external impact force acting upon the helmet for efficiently protecting the wearer's head to be superior to the conventional helmets.

The helmet of the present invention can be made of thermoplastic polyurethane or other elastomers, but not limited in this invention.

I claim:

1. A safety helmet comprising:
   an outer shell;
   an inner shell juxtapositionally secured to the outer shell confining an air chamber spaced between the outer shell and the inner shell;
   a plurality of cushioning bellows each said bellows retained between the outer shell and the inner shell;

an air-penetrable layer adhered on an inside surface of the inner shell; and a cap frame sealably combining the outer shell, the inner shell and the air-penetrable layer for forming a complete helmet to be worn by a wearer, whereby upon an acting of an external impact force upon the outer shell, the cushioning bellows will dampen the external impact force to prevent a great shock caused by the external force to the wearer's head;

said inner shell formed with a plurality of venting holes in the inner shell for fluidically communicating the air chamber defined between the two shells and the air-penetrable layer adjacent to a wearer's head; and each said cushioning bellows made of resilient elastomers including: a plurality of flexible corrugated flanges circumferentially gradationally formed on an outer cylindrical wall of the bellows, a central socket formed in a central portion of the bellows and downwardly recessed from an upper portion of the bellows having an uppermost flange of the corrugated flanges normally contacting an inside surface of the outer shell forming an air sac in the central socket between the bellows and the outer shells, and a retaining base portion formed on a bottom portion of the bellows engageably fixed in each bellows hole formed in the inner shell.

2. A safety helmet according to claim 1, wherein said inner shell further includes a pair of ear shields on two opposite sides of the inner shell for holding a wearer's two ears in the shields having a plurality of inner perforations drilled in each said ear shield; and the outer shell includes a plurality of outer perforations drilled in two opposite sides on the outer shell projectively corresponding to the two ear shields of the inner shell for transmitting outside or environmental sound waves through the outer perforations, the inner perforations and the air-penetrable layer towards the wearer's ears.

3. A safety helmet according to claim 2, wherein said outer perforations formed in the outer shell operatively ventilate air or moisture from or in the air chamber between the outer shell and the inner shell and from the wearer's head for a comfortable wearing of the helmet.

* * * * *